United States Patent [19]
Karaganis
[11] 3,735,265
[45] May 22, 1973

[54] RADIO COMMUNICATION/CONTROL SYSTEM FOR RESTRICTED RANGE SIGNALING NEAR THE EARTH'S SURFACE

[75] Inventor: James J. Karaganis, Rockville, Md.
[73] Assignee: Peter V. Gureckis, Potomac, Md.
[22] Filed: Nov. 24, 1970
[21] Appl. No.: 92,389

[52] U.S. Cl. ....................... 325/28, 179/82, 325/51
[51] Int. Cl. ....................... H04h 1/00
[58] Field of Search ....................... 179/82, 170 J; 325/28, 51, 308, 178; 307/2

[56] References Cited

UNITED STATES PATENTS

| | | | |
|---|---|---|---|
| 3,470,474 | 9/1969 | Rohrer | 179/82 X |
| 2,020,297 | 11/1935 | Buckley et al. | 179/170 J |
| 2,478,133 | 8/1949 | Shanklin | 179/82 X |
| 2,980,793 | 4/1961 | Daniel | 179/82 X |
| 3,406,265 | 10/1968 | Richter, Jr. | 179/170 J |

*Primary Examiner*—Benedict V. Safourek
*Attorney*—Keith Misegades and George R. Douglas, Jr.

[57] ABSTRACT

A communications and control system for providing radio signaling between one or more fixed terminals, transmitting and/or receiving radio frequency signals through a system of conductors located at or below the surface of the earth and so juxtaposed mechanically and electrically (in terms of relative current amplitude and phase) as to provide relatively strong radio frequency field intensities in the immediate vicinity of the conductor system, while creating greatly attenuated fields outside said vicinity for purposes of minimizing interference with other signaling systems or for denying access to the subject communication and control network, and one or more other transmitting and/or receiving terminals, fixed or mobile (such as may be represented by a suitably equipped vehicle or ambulatory person), as well as certain means for optimizing the distribution of the radio frequency field within the useful range of the system.

8 Claims, 8 Drawing Figures

Patented May 22, 1973 3,735,265

2 Sheets-Sheet 1

INVENTOR
JAMES J. KARAGANIS

BY Mussgades & Douglas
ATTORNEYS

*INVENTOR*
JAMES J. KARAGANIS

BY *Misegades & Douglas*
ATTORNEYS

RADIO COMMUNICATION/CONTROL SYSTEM FOR RESTRICTED RANGE SIGNALING NEAR THE EARTH'S SURFACE

The invention with its several embodiments relates generally to a system in which radio frequency communication and/or control is desired to be achieved only within relatively close proximity to the radiating means. Thus, the invention exploits the known physical phenomenon that far field radiation from a system of closely spaced parallel conductors can be made very small by assuring that the net algebraic sum of the radio frequency currents traversing the system as a whole be zero, or almost zero, whereas the current in any individual conductor may be arbitrarily large. Although the far field radiation is thus kept to a low value, the near fields in the vicinity of the array can be quite large. In addition, the near field exhibits variations in amplitude and polarization as a function of coordinate location near the array so that, depending upon the information channel configuration (specifically the polarization of the antenna(s) of the terminal(s) with which information exchange is to be accomplished), the geometry of the parallel array can be determined to maximize the effectiveness with which communication is accomplished.

The above and other objects and advantages of the invention will become apparent upon full consideration of the following detailed description and accompanying drawings in which.

Figure 1:
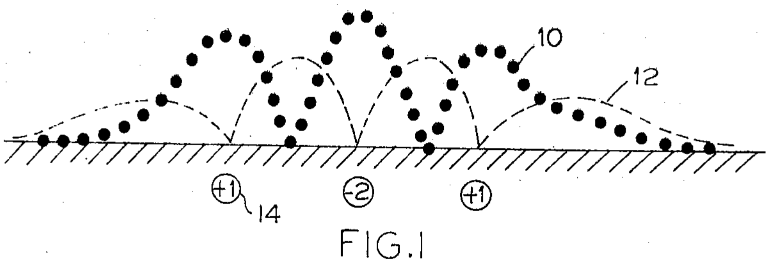
FIGS. 1–6 are a cross-section of a roadway showing various preferred embodiments of the invention.
Figure 2:
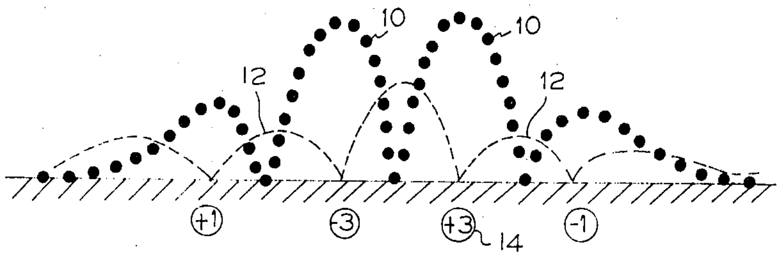
Figure 3:
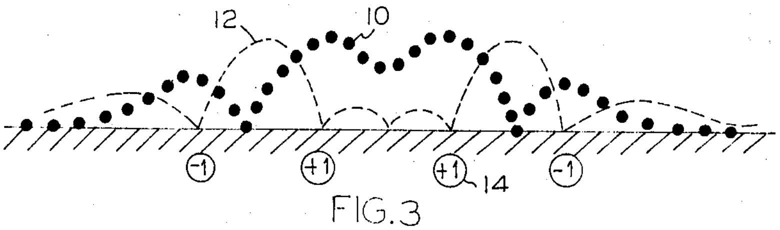
Figure 4:
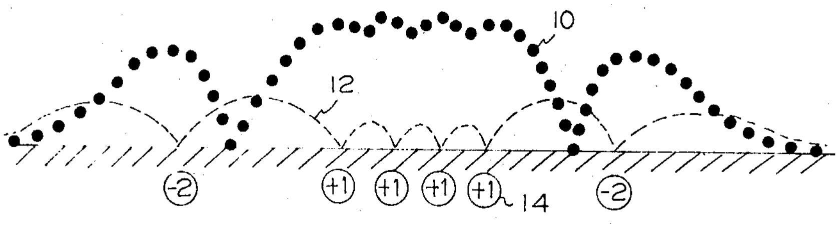
Figure 5:
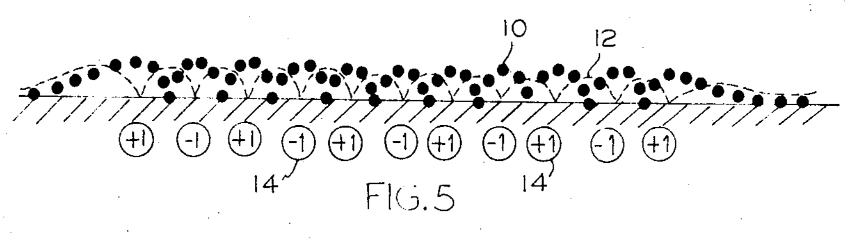
Figure 6:
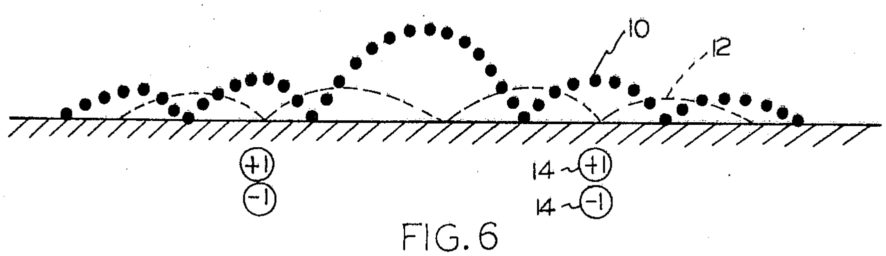

Referring to the drawings, the dotted lines 10,10 represent the relative vertically polarized field intensity amplitude (both positive and negative) 12,12, while the dashed lines represent the relative horizontally polarized field intensity amplitude. These diagrams show plane cross-sections perpendicular to the longitudinal axes of the arrays. The small circles with algebraically signed numbers represent the coaxial conductors or array conductors 14, while the algebraic sign indicates relative current sense. Thus, a "+" sign can be taken to represent current entering the plane of the diagram, while a "—" sign indicates current leaving the plane of the diagram. The said numbers indicate the relative magnitude of the currents. It can be seen that in those embodiments (FIGS. 1, 2 and 5) in which the current sense is alternately positive and negative, the effective vertically polarized field intensity is strongest directly above each conductor and falls to zero within each intervening gap, whereas the horizontally polarized field intensity is strongest within the gaps and falls to zero directly over the conductors 14. On the other hand, by making one or more adjacent conductors possess the same current sense (as in FIGS. 3 and 4), it is possible to sustain a non-zero vertically polarized field throughout the gap. In addition, for example, the current magnitudes of the four center conductors in FIG. 4 could be redistributed among these four conductors 14 to achieve a greater uniformity of vertically polarized field above said conductors provided that the total number of current units allocated to them remained equal to "+4" in this case. A similar sustenance of the vertically polarized field with the gap is accomplished as shown in FIG. 6, in which the array elements are composed of vertically disposed pairs.

Figure 7:
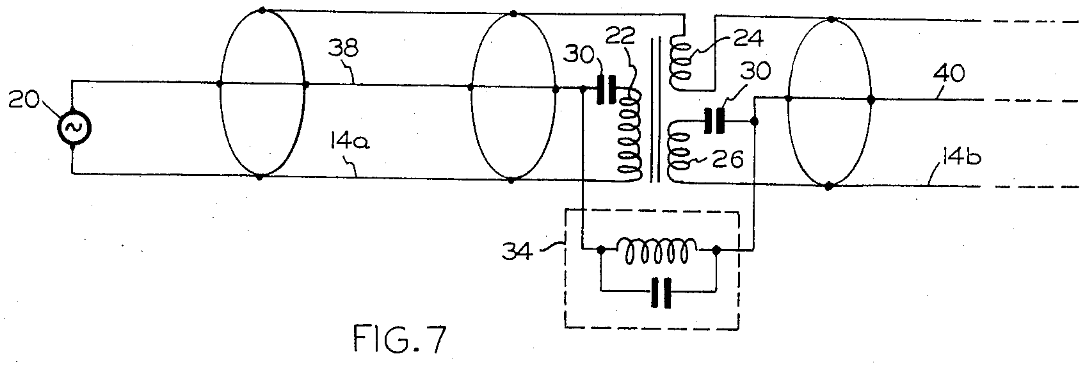
FIG. 7 is a schematic circuit diagram of a preferred embodiment of one coaxial cable system.

A further embodiment of the invention is shown in FIG. 7, in which each one or more of the conductors of the previous discussion is made hollow and is provided with additional internal conductors to form a coaxial transmission line **14*a*,14*b*. Large amounts of radio frequency power can then be fed down the interior of this line from a source 20 without any radiating effects and with very low loss. At periodic intervals, a bridging transformer 22 forming a passive device is inserted between segments of the coaxial line 14*a*,14*b*, so that a small portion of the power can be extracted and fed by means of a secondary winding 24 to the outer conductor of the coaxial line 14*b* and thus to participate in the radiating process by restoring the desired current level which will have decreased due to the relatively large losses in the earth. Another secondary winding 26 couples the remaining power into the subsequent coaxial line 14*b* to be delivered to the next power tapping bridging transformer (not shown) in the form of a passive device. Capacitor 30 provides power line frequency isolation from the transformer 22, while radio frequency trap 34 provides power line frequency connection and radio frequency isolation between the center conductors 38,40 of the adjacent coaxial line 14*b*. Thus, the coaxial line 14*a*,14*b*** can be used to transmit d.c. or a.c. power to any eventual active devices or repeaters that may be required.

Figure 8:
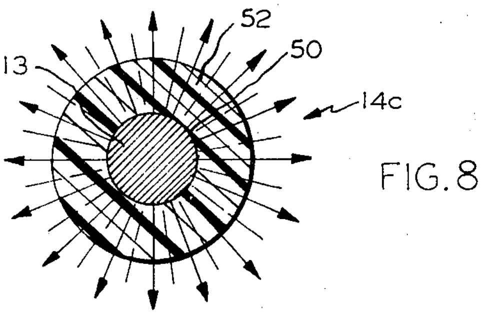
FIG. 8 is a cross-section of a low lossinsulated conductor according to another mode of the invention.

FIG. 8 represents a further mode of the invention which also minimizes variations in field intensity along the longitudinal axis of the array by reducing dielectric losses in the earth. Since the near field is most intense at the surface of the coaxial conductor such as an array conductor **14*c*, as is evidenced by the closer spacing of the approximately vertical lines of force 50 as the conductor surface is approached, the incorporation of a thick layer of low loss insulating material 52** around the conductor eliminates most of the dielectric losses which would have been incurred had the insulating material volume been replaced by earth.

Thus, there is provided a conductor element which may be used as a set of four or more road-imbedded conductors or wires comprising a substantial sized conductor means measured along its diameter, and in which the conductor is encased in a generally low dielectric constant or lossy insulation material also of substantial thickness relative to the diameter of the conductor wire.

What is claimed is:

1. A radio communications system for intercommunications and control from a fixed station, comprising:

at least two of a plurality of longitudinally disposed conductors generally parallel and juxtaposed in physical placement with respect to a communicating region, including means wherein the radio frequency current value and the phase and magnitude thereof are chosen for the communicating region so as to produce relatively small radio field intensities in said communicating region, while generally establishing a desired distribution of horizontally and vertically polarized "near field" intensities by exploiting the existence of said vertically polarized "near field" intensity essentially directly above at least one of the conductors tending toward a maximum value while the existence of said horizontally polarized "near field" intensity tends toward a minimum value;

said system for transmitting a radio communication signal to vehicles for traveling along the roadway, comprising:

a radio communications transmitter means having terminal means for connection with an input signal coupled thereto from a program signal source and producing an output drive signal coupled therefrom, said conductors consisting of a length of coaxial line having an inner conductor and an outer conductor disposed and oriented longitudinally beneath a roadway or ground surface, and being driven at one end by said transmitter means, the other end of said coaxial line terminating in a passive device, and an added length of coaxial line similarly constructed to aid conductors of coaxial line, disposed and oriented for extending the roadway communications system being driven at one end by coupling to said passive device, said passive device comprising a capacitor and a primary transformer winding in series across the inner and outer conductor of the terminating end of the coaxial line, a first secondary transformer winding having one terminal connected to the outer conductor of the terminating end of the coaxial line, and the other terminal connected to the outer conductor of the driven end of the added length of coaxial line, a second secondary transformer winding inductively coupled to said primary transformer winding having one terminal capacitively coupled to the inner conductor of the driven end of the added coaxial line, and the other terminal connected to the outer conductor of the driven end of the added length of coaxial line, and a frequency trap filter means coupled between the inner conductor of the terminating end of the coaxial line and the inner conductor of the driven end of the added length of coaxial line.

2. The invention according to claim 1, including means wherein the vector sums taken along a perpendicular cross-section of said conductors is essentially a sum in approximation of zero.

3. The radio communication system of claim 1, wherein said system for transmitting a radio communication signal to vehicles for traveling along the roadway comprises, a radio communications transmitter means having terminal means for connection with an input signal coupled thereto from a program signal source and producing an output drive signal coupled therefrom, said conductors of claim 1 consisting of a length of coaxial line having an inner conductor and an outer conductor disposed and oriented longitudinally beneath a roadway or ground surface, and being driven at one end by said transmitter means, the other end of said coaxial line terminating in a passive device, and an added length of coaxial line similarly constructed to said conductors of coaxial line, disposed and oriented for extending the roadway communications system being driven at one end by coupling to said passive device, said passive device comprising a capacitor and a primary transformer winding in series across the inner and outer conductor of the terminating end of the coaxial line, a first secondary transformer winding having one terminal connected to the outer conductor of the terminating end of the coaxial line, and the other terminal connected to the outer conductor of the driven end of the added length of coaxial line, a second secondary transformer winding inductively coupled to said primary transformer winding having one terminal capacitively coupled to the inner conductor of the driven end of the added coaxial line, and the other terminal connected to the outer conductor of the driven end of the added length of coaxial line, and a frequency trap filter means coupled between the inner conductor of the terminating end of the coaxial line and the inner conductor of the driven end of the added length of coaxial line.

4. The invention of claim 1 wherein the coaxial lines are without insulation and imbedded in the roadway which serves to couple the radio communication signal to said vehicles.

5. The invention of claim 1, wherein the coaxial lines are provided with external insulation which together with the roadway serves to couple the radio communication signal to said vehicles.

6. The invention of claim 1, wherein a plurality of coaxial lines are fed from said transmitter means.

7. The invention of claim 1, wherein a conductor is a substantial sized conductor means measured along its diameter and in which the conductor is encased in a generally low dielectric constant or lossy insulation material also of substantial thickness relative to the diameter of the conductor wire.

8. The invention according to claim 1, wherein a plurality of coaxial conductors is disposed parallel under a road or ground surface, and in which certain of the conductors carry increased amplitude over others, resulting in maximizing field strength over certain of the conductors and minimizing field intensity over others, resulting in an effective vertically polarized field intensity produced over certain of the conductors, each of which is individually horizontally polarized.

* * * * *